April 6, 1965 P. SMITH 3,176,681

METHOD FOR DIGITAL PULSE DETECTION

Filed Nov. 20, 1961 2 Sheets-Sheet 1

PETER SMITH
INVENTOR

INVENTOR
PETER SMITH 3,176,681
METHOD FOR DIGITAL PULSE DETECTION
Peter Smith, Glendola, N.J., assignor to Dynamics Corporation of America, New York, N.Y., a corporation of New York
Filed Nov. 20, 1961, Ser. No. 153,423
1 Claim. (Cl. 128—2.05)

This invention relates to a transducing method and more particularly to an improvement in transducing methods for detecting arterial pulsations in the form of generated electrical signals.

Two major problems encountered in the use of electromechanical transducers in the field of arterial pulse detection are the deleterious effects produced by electromagnetic forces and extraneous mechanical forces other than those desired acting upon the transducing element used for detection. The effects produced by exterior electromagnetic forces are commonly known as spurious signals. The extraneous mechanical forces are commonly known as artifact. The specification uses this terminology to define these two effects.

Transducing devices are in use at the present time in the field of arterial pulse detection. Attempts have been made to design the particular device used in order to reduce artifact to a minimum whereby it will be useful for the purpose intended. The results obtained by the modifications of a single transducing device have been successful to a certain extent and have in many cases reduced the artifact to a point where the device may be put to practical use. Such a transducing device is shown and described in the copending U.S. patent application Serial No. 132,354 filed in the name of the present inventor on August 18, 1961, now U.S. Patent No. 3,107,664 issued on October 22, 1963. Although this device remarkably reduces the amount of artifact produced by movement of the digit so that it could be used, it was still not possible to completely eliminate signals induced by movement of the digit. If artifact can be completely eliminated and the effect of exterior electromagnetic forces reduced to a minimum, the accuracy of the transducing device shall then meet the ultimate requirement of exact detection measurements.

Accordingly, it is an object of this invention to provide a transducing device for converting arterial pulsations into corresponding electrical signals.

Another object of this invention is to provide a transducing device including electrical circuitry therefor for eliminating artifact in the signal output.

Yet another object of this invention is to provide a transducing device including electrical circuitry for eliminating spurious signals from the output thereof.

A further object of this invention is to provide a transducing device for eliminating both spurious signals and artifact in the signal output.

A still further object of this invention is to provide a transducing device having the above attributes which is relatively simple and economical to manufacture.

Another object of this invention is to provide a method of producing an artifact-free electrical signal representative of the arterial pulse in digit.

Further objects and advantages of the present invention will become apparent to those skilled in the art from the following description when taken in conjunction with the accompanying drawings in which.

Figure 1:
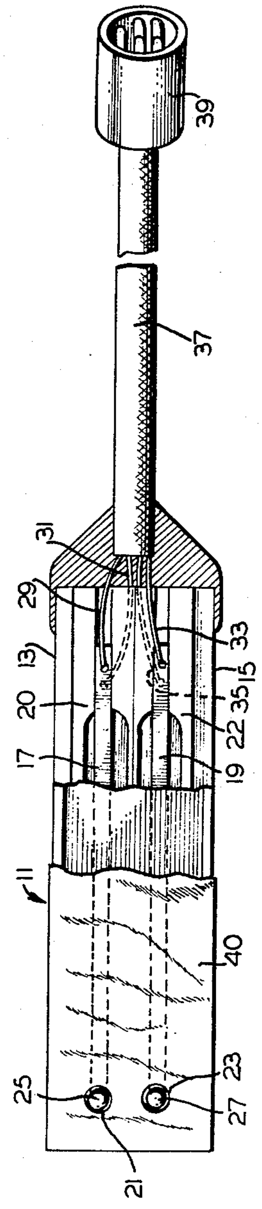
FIG. 1 is a plan view taken partially in section of an illustrative transducing device for use in the present invention.

Turning now more specifically to the drawings, FIG. 1 illustrates a transducing device 11 which is comprised of two housings 13, 15 having bimorph crystal units 17 and 19 mounted respectively therein. Two apertures 21 and 23 are provided through the housings 13, 15 respectively of the device 11 in order that two non-conductive buttons 25 and 27 may extend therethrough and be mechanically depressed. Buttons 25 and 27 are mounted at the outer end of bimorph crystals 17 and 19. Each of the crystals is mounted in respective wall members 20 and 22 of their respective housings and are securely held thereby. Standard connections are made to the electrodes on the opposite faces of the bimorph crystal and are indicated as leads 29, 31, 33 and 35. These leads pass into a cable 37 and terminate in a five-pronged plug 39 with the cable 37 supplying the common ground. The illustrative device of FIG. 1 is, in effect a combination of two of the housings including the crystals disclosed in the above-mentioned copending application and reference is hereby made to that application for particular details of this device.

Figure 2:
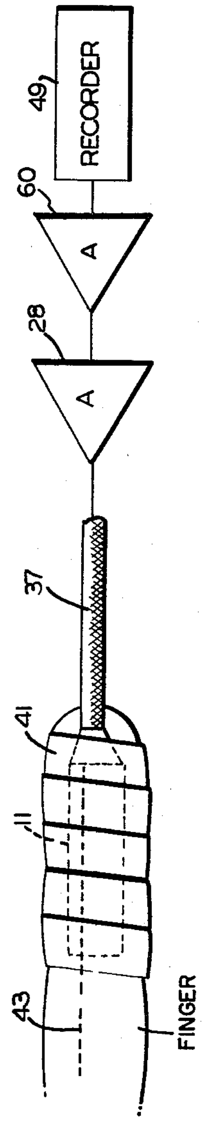
FIG. 2 is a schematic representation of the device of FIG. 1 as applied to a digit of the patient together with amplifying means and a recorder.

As illustrated in FIG. 2, the transducing device 11 is securely strapped to the finger or digit of the patient by means of tape 41 or the like and is located in a manner such that one of the two buttons lies over the main artery of the digit whereby the button of that particular crystal is depressed by the pulsations in the artery. The other adjacent button is not affected by the artery but lies with the button adjacent the pulp of the fingers so that any movement of the patient creating artifact will have substantially the same effect on both of the crystals, but the arterial pulsations will affect only one of the crystals. The housings 13 and 15 are adjacent to each other and, therefore, the crystals 17 and 19 lie in substantially the same plane. The buttons protrude equally from each housing. This planar relationship assures equal contact of both buttons with the digit when the device is taped over the digit. These signals are combined in amplifiers 28 and 60, which will be discussed in detail as the description proceeds, and are then sent to an indicating means such as a recorder 49 or the like.

Figure 3:
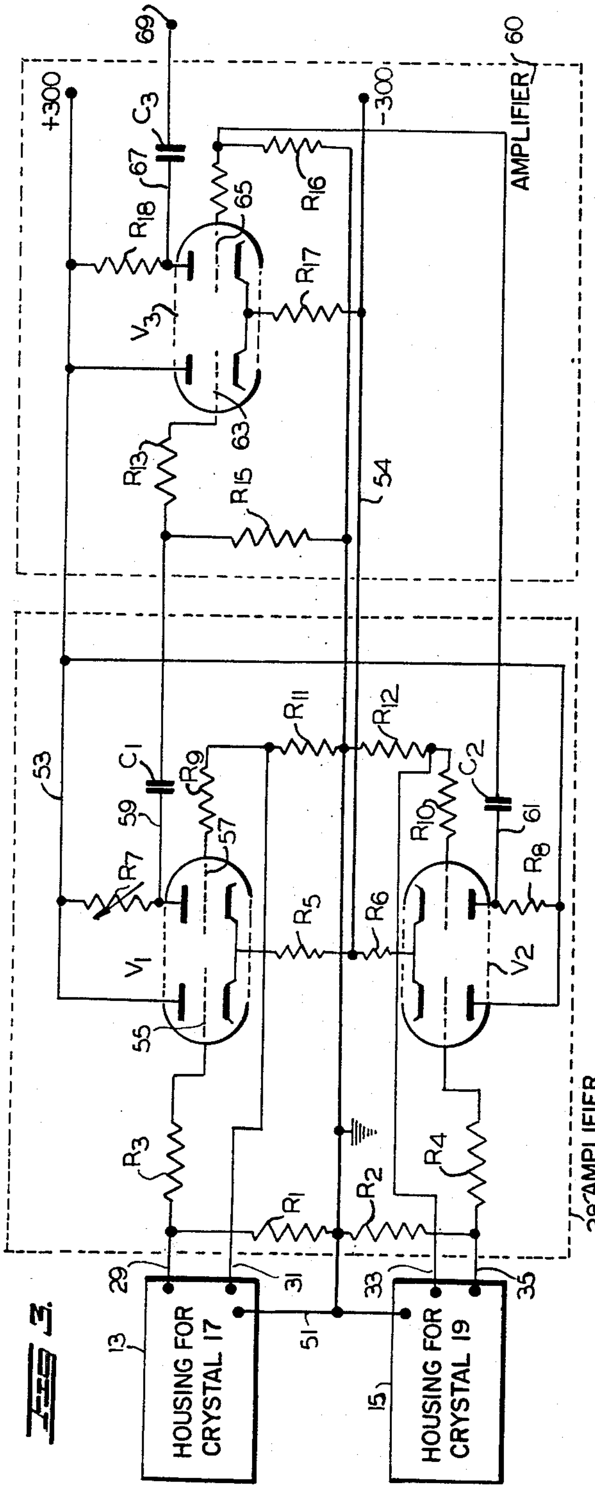
FIG. 3 is a schematic electrical diagram of the present invention as used for eliminating both spurious signals and artifact.

FIG. 3 illustrates schematically the arrangement of the amplifying circuitry of the present invention with the crystals 17 and 19 within housings 13 and 15 connected to the common ground 51. That portion of FIG. 3 enclosed within the dotted line represents the circuitry of the amplifier 28 for eliminating spurious electromagnetic signals induced in the cable by other equipment in the vicinity of the transducing device. It will be appreciated that, under normal usage, the cable 37 will be of substantial length and in the illustrative figure shown in FIG. 3, the terminals 29, 31, 33, 35 and ground represent the point at which the five pronged plug 39 is connected to the amplifier. That portion of the circuitry enclosed within the dotted line 60 represents the circuitry of the amplifier 60 for eliminating the above discussed artifact.

The output leads 29 and 31 of crystal 13 are connected to the grids 55 and 57 of the dual triode $V_1$ through resistors $R_3$ and $R_9$ respectively. As mentioned above, the leads 29 and 31 from piezoelectric crystal 17 are of considerable length. Although only one lead has a pulse signal from the crystal impressed thereon, both of the leads 29 and 31, because of their length, will have induced therein any exterior noise signals. These exterior noise signals usually result from additional equipment operating in the vicinity of the machine and produce in each of the leads 29 and 31 a substantially 60 c.p.s. sine wave.

As shown in the particular connections, this sine wave is part of the signal fed to the control grid 55 from lead 29 and also fed to the control grid 57 from lead 31. $V_1$ is a substantially well-known type of differential amplifier and with this particular connection with the primary output taken through lead 59 these common sine wave signals will cancel each other within the differential amplifier $V_1$. The output of tube $V_1$ is passed through capacitor $C_1$ and accordingly will provide a signal in which any spurious signal effects induced in the cable have been cancelled by the tube $V_1$. Crystal 15 acts in the same manner with the leads 33 and 35 connected to the grids of tube $V_2$ through resistors $R_{10}$ and $R_4$ respectively. The cancellation of the common interference sine wave signal in $V_2$ is substantially the same as that described above in connection with $V_1$. Accordingly, the output on lead 61, through capacitor $C_2$, will also be free of any spurious signals induced in the output leads 33 and 35. The two cathodes of each of the tubes $V_1$ and $V_2$ are connected to a B− supply through lead 54 and resistors $R_5$ and $R_6$. Large protective resistors $R_1$, $R_2$, $R_{11}$ and $R_{12}$ are provided between the output leads and the ground. The plate supply voltage is provided to each of the anodes of the dual triodes $V_1$ and $V_2$ through lead 53. The plate supply to $V_1$ is provided with an adjustable resistor $R_7$ in order to initially match the supply to the anode of both tubes in order to insure equal outputs therefrom. $R_7$ is adjusted so as to substantially match the plate supply as determined by load resistor $R_8$.

The two signals passing through $C_1$ and $C_2$, being free of spurious signals generated in the cable, are passed to the respective grids 63 and 65 of a differential amplifier comprising the dual triodes of the tube $V_3$. Each of the signal components from $V_1$ and $V_2$ being free of the extraneous spurious signals discussed above, still contain not only the pulse signal but the artifact signal generated within the crystals by movement of the digit. This artifact signal is normally of a high frequency, low amplitude. Because of the connections of lead 59 to the grid 63 and lead 61 to the grid 65, the two signals produced from triodes $V_1$ and $V_2$ are 180° out of phase. Therefore, the amplifier $V_3$ will cancel these out of phase signals and have an output at terminal 69 which is representative of only the signal output from crystal 17 which is not common with the output of crystal 19 having already cancelled the common out of phase signals produced by amplifiers $V_1$ and $V_2$. Again, the dual cathodes are connected to the B− supply through resistor $R_{17}$ and the anodes are connected to the B+ supply. The output from the differential amplifier $V_3$ is taken through lead 67 and capacitor $C_3$ to the output terminal 69.

As may now be seen, since one of the tubes $V_1$ and $V_2$ has an output representative of the signal caused by arterial pulsation and artifact and the other tube has an output signal representative only of the same artifact, the output of the differential amplifier $V_3$ will contain only the signal generated by the arterial pulsations since the differential amplifier cancels the identical artifact signals. Accordingly, the substantially pure signal, having a minimum of spurious signals therein, will be available for an exact reading by an indicating means such as a recorder as shown in FIG. 2.

Figure 4:
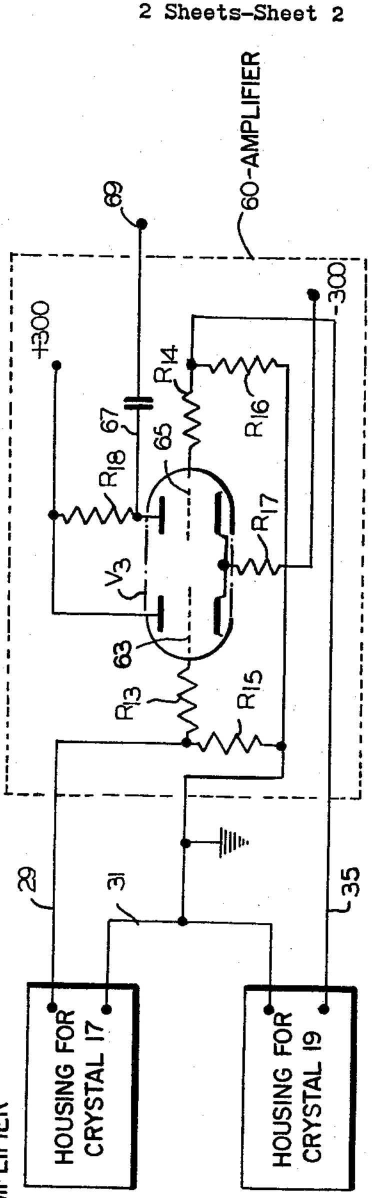
FIG. 4 is a schematic diagram of the invention as used for eliminating only artifact.

FIG. 4 is a schematic illustration of a detector which is, in effect, a subcombination of that shown in FIG. 3. This system may be used when no spurious signals are present to affect the long output leads from the crystals. Two of the output leads are connected to a common ground and, therefore, only a three pronged plug would be required. Otherwise, the operation of the differential amplifier 60 and resultant elimination of artifact is identical to that described above with the circuitry for removing the spurious signals being eliminated.

It should be emphasized that the above description and the drawings are illustrative only since the system is applicable to any type of transducing device whose physical dimensions permit a side-by-side relationship of the crystals during use to obtain the common artifact signals from each of the crystals and, at the same time provide for arterial pulsation signals only in one crystal. The use of the transducing device of the above-mentioned copending application has proven to be successful with this system. Although various combinations of parametric values could be used in obtaining the desired outputs, a system having the following parameters provides excellent results:

| | | |
|---|---|---|
| $R_1$ | megohm | 1 |
| $R_2$ | do | 1 |
| $R_3$ | kilohm | 1 |
| $R_4$ | do | 1 |
| $R_5$ | do | 820 |
| $R_6$ | do | 820 |
| $R_7$ | megohm | 0–2 |
| $R_8$ | do | 1 |
| $R_9$ | kilohm | 1 |
| $R_{10}$ | do | 1 |
| $R_{11}$ | megohm | 1 |
| $R_{12}$ | do | 1 |
| $R_{13}$ | kilohm | 1 |
| $R_{14}$ | do | 1 |
| $R_{15}$ | megohm | 1 |
| $R_{16}$ | do | 1 |
| $R_{17}$ | kilohm | 820 |
| $R_{18}$ | megohm | 1 |
| $C_1$ | microfarad | .01 |
| $C_2$ | do | .01 |
| $C_3$ | do | .01 |
| $V_1$ | | 12AX7 |
| $V_2$ | | 12AX7 |
| $V_3$ | | 12AX7 |

Various modifications will now be apparent to those skilled in the art in the light of the above description when taken in conjunction with the drawings. Accordingly, the scope of the invention is to be limited only by the appended claim.

I claim:

A method of detecting an arterial pulse within a digit which comprises generating a first signal representative of the arterial pulse and the artifact resulting from movement of the digit, generating a second signal representative of the artifact resulting from movement of the digit, combining said first and second signals in a manner such that the like artifact signals are of opposite polarity, and activating an indicating device with the resultant signal representative of said digital pulse.

References Cited by the Examiner

UNITED STATES PATENTS

| | | | |
|---|---|---|---|
| 2,409,749 | 10/46 | Foulger | 128—2.06 |
| 2,622,150 | 12/52 | Coulter | 128—2.06 X |
| 2,658,505 | 11/53 | Sheer. | |
| 2,756,741 | 7/56 | Campanella. | |
| 2,865,365 | 12/58 | Newland. | |
| 2,944,542 | 7/60 | Barnett. | |
| 3,029,808 | 4/62 | Kagan | 128—2.06 |
| 3,040,737 | 6/62 | Kompelien. | |

RICHARD A. GAUDET, *Primary Examiner.*

RICHARD J. HOFFMAN, *Examiner.*